UNITED STATES PATENT OFFICE.

JOHN T. GREENWOOD, JR., OF BELOIT, WISCONSIN.

FIREPROOFING COMPOUND.

SPECIFICATION forming part of Letters Patent No. 322,280, dated July 14, 1885.

Application filed March 28, 1885. (Specimens.)

*To all whom it may concern:*

Be it known that I, JOHN T. GREENWOOD, JR., a citizen of the United States, residing at Beloit, in the county of Rock, and State of Wisconsin, have invented certain new and useful Improvements in Fire-Proof Paint; and I do declare the following to be a full, clear, and exact description of the invention, such as will enable others skilled in the art to which it appertains to make and use the same.

This invention has relation to fire-proof and other paints; and the novelty consists in combining the ingredients properly, so that the resulting composition will resist the action of the elements.

In compounding this mixture I proceed as follows: In a suitable receptacle I place fifty gallons of coal-tar, then add five pounds of silicate of soda, twelve pounds of asbestus, eight pounds plaster-of-paris, twelve pounds of fine salt, and stir the same until all the ingredients are thoroughly incorporated. Next, I add five pounds of red lead, eight pounds of litharge, one gallon of asphaltum, five pounds of Venetian red or other suitable pigment or coloring-matter, and again stir until the mixture has become a homogeneous mass.

This paint is intended especially to resist the action of fire, although it is very well adapted by its application to prevent dampness from entering a dwelling or to preserve any article from the influences of the weather when exposed thereto.

What I claim, and desire to secure by Letters Patent, is—

The paint composition herein described, consisting of coal-tar, silicate of soda, asbestus, plaster-of-paris, salt, red lead, litharge, asphaltum, and Venetian red or other pigment or coloring-matter, substantially as specified.

In testimony whereof I affix my signature in presence of two witnesses.

J. T. GREENWOOD, JR.

Witnesses:
PHILIP C. MASI,
M. P. CALLAN.